FIG. 1

LEE V. SMOLL
INVENTOR.

FIG. 2

LEE V. SMOLL
INVENTOR.

May 2, 1967 L. V. SMOLL 3,317,238
COMBINATION STRUCTURE FOR AUTOMOBILES
Filed July 28, 1965 8 Sheets-Sheet 3

LEE V. SMOLL
INVENTOR.

BY *Ely Silverman*

ATTORNEY

May 2, 1967 L. V. SMOLL 3,317,238
COMBINATION STRUCTURE FOR AUTOMOBILES
Filed July 28, 1965 8 Sheets-Sheet 7

LEE V. SMOLL
INVENTOR.

BY
*Ely Silverman*
ATTORNEY

May 2, 1967 — L. V. SMOLL — 3,317,238
COMBINATION STRUCTURE FOR AUTOMOBILES
Filed July 28, 1965 — 8 Sheets-Sheet 8

LEE V. SMOLL
INVENTOR.

BY Ely Silverman

ATTORNEY

United States Patent Office 3,317,238
Patented May 2, 1967

3,317,238
COMBINATION STRUCTURE FOR AUTOMOBILES
Lee V. Smoll, 8133 Triangle Drive,
Amarillo, Tex. 79107
Filed July 28, 1965, Ser. No. 475,383
9 Claims. (Cl. 296—69)

This invention relates to interior structure providing for combined chairs, a combined car bed or a table for use in an automobile of the sedan type.

More specifically, the apparatus of this invention comprises a combination of a series of hingedly connected panels and a support frame which operate as integral combinations which form into cushioned beds, or cushioned seats, or a desk. The apparatus is removable and is especially adapted for use in small automobiles.

Known beds for automobiles of prior art have lacked cushions or have not been firmly locatable in the automobile or required much manipulation and additional structures in order to bring the various parts of the bed structure into their proper alignment.

One object of this invention is to provide cushions and a support assembly therefor which not only provide comfortable cushioned passenger chairs for use within the car, but also permits a convenient and ready transformation of the automobile from a conventional sedan vehicle to comfortable and secure cushioned sleeping quarters with a minimum of additional structures and manipulation.

Another object of this invention is to provide an apparatus which provides a desk as well as a seat and bed arrangement for the occupants of the vehicle.

Yet another object of this invention is to provide that the vehicle may be used as a vehicle while it is also being, in part, used as a sleeping quarters or with a desk or table.

Still another object of this invention is to provide a frame apparatus composed of only three permanently interconnected parts which frame readily is installed and which is operated without the use of any special tools and utilizes the same cushions for seat and bed.

Other objects of this invention will be apparent to those skilled in the art on the study of the below specification and drawings, which drawings form a part of this specification and wherein like numerals refer to the same parts throughout and wherein:

FIGURE 5G is taken at position 5G—5G of FIGURE 5F.

The apparatus 50 according to this invention comprises the base subassembly 51, a panel subassembly 52 and a cushion assembly 55. The panel subassembly in turn is composed of a left panel subassembly 53 and a right panel subassembly 54. The parts of cushion assembly 55 are supported on subassembly 52. Subassemblies 53 and 54 are mirror images of each other and supported on base subassembly 51. The base subassembly 51 is firmly attached to the frame 56 of a conventional automobile 57.

In a particular preferred embodiment of this invention, the base subassembly 51 comprises a base panel 60, a foldable front panel subassembly 62, and a right rear support subassembly 64.

The rear support subassembly 64 comprises a rigid horizontal flat panel member 66 which, at its front end, is firmly fixed to a vertical flat rigid panel member 68. The vertical member 68 is firmly attached to and supports two pairs of hinge brackets: the left pair comprising the lateral left hinge bracket 70 and the central left hinge bracket 72; the right pair comprising the lateral right hinge bracket 74 and more centrally the central right hinge bracket 76.

A pair of rigid steel brackets, 78 on the left side and 80 on the right, firmly attaches the support subassembly 64 to the base panel 60 of the base panel subassembly 51. The base panel 60 is provided with a left L-shaped body engaging the bracket 81 and a similar right bracket 82. The brackets are firmly attached to the body 56 as by bolts and nuts 83 and 84, respectively.

The foldable front panel subassembly 62 comprises in turn a front base panel subassembly 85 and a left front pivotal panel subassembly 87 and a right pivotal panel subassembly 88. The front base panel subassembly 85 is firmly fixed to the base panel 60. The subassemblies 87 and 88 are each pivotally attached to the subassembly 85 and are mirror images of each other.

Figure 7:
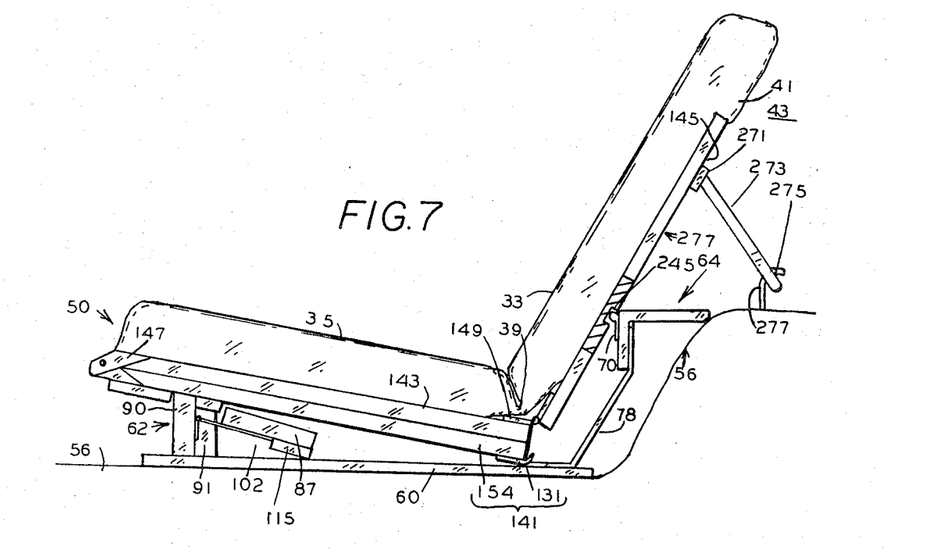
FIGURE 7 is a side view, partly in section along plane 7—7 of FIGURE 2, of panel subassembly 53 and base assembly 51 showing relations thereof when used as a chair.

The subassembly 85 comprises a rectangular sturdy base piece 90 which extends the full width of subassembly 85 which is also the full width of the panel 60. There is firmly attached to the rear surface of the piece 90 a left locator block 91 and a right locator block 92. A locking lug 93 projects laterally of the block 91 and is firmly attached thereto. A locking lug 94 projects laterally of the block 92 and is firmly affixed to that block and to the piece 90. These locator blocks and lugs 93 and 94 respectively serve to engage projections on the panel subassemblies 141 and 142 when those subassemblies are in the position thereof wherein they form into a seat as shown in FIGURE 7.

Block 91 does not extend the full width of the piece 90 and leaves a lateral space 95 to the left of the left end of block 91; similarly, a space 96 is left on the rear of piece 90 between the central ends of blocks 91 and 92 and a space 97 is also left to the right of the right end of block 92.

A hinge 100 is located with its lower end 101 firmly fixed to the piece 90. The upper piece 102 of the hinge 100 is firmly attached to the subassembly 87. A similar hinge 104 is similarly attached to subassembly 87 and the piece 90 and has its lower portion located in the lefthand portion of space 96. Another hinge 105, also located with its upper pivotal end firmly attached to the subassembly 88 and its lower end attached to the base piece 90 within the right hand portion of space 96. A similar hinge 106 is attached, as 105, with its upper, pivotal end, firmly attached to the lateral portion of subassembly 88 and its lower portion attached to piece 90 in the space 97. The pivot pins of hinges 100, 104, 105, and 106 are all co-axial with each other. All are located at the same height above the bottom edge of piece 90.

The pivotal panel subassembly 87 is formed of a pivotal support plate 111 which has a substantial thickness (¾ inch in the preferred embodiment, as is piece 90) and is generally rectangular in section and outline; it is pivotally attached by the hinges 102 and 104 to the base piece 90. The top portion of plate 111 is provided with a hand hole 113 generally at its center and adequate for an adult to place their hand through such size hole. Additionally the plate 111 has firmly attached thereto a locator block 115. Block 115 is a solid rectangular block of wood firmly affixed to the rear of plate 111 to engage a downward projection 177 of the panel subassembly 141 whereby to hold the panel 154 from lateral movement when that projection 177 engages the central portion of the block 115, and prevents lateral motion thereof when the subassembly 53 is in the position thereof in which it forms a bed as in FIGURE 6.

Subassembly 88 is a mirror image of subassembly 87 and of the same size, and formed of a plate 112 corresponding in size and shape to the plate 111; has a hand hole 114 therein corresponding to hand hole 113 and is provided with a locking block 116 identical in size and shape as block 115. Block 116 serves, by engaging the downward projection 178 of the subassembly 142 to prevent lateral motion thereof when the subassembly 142 is in the position thereof in which it forms a bed as in FIGURE 6.

Figure 5A:
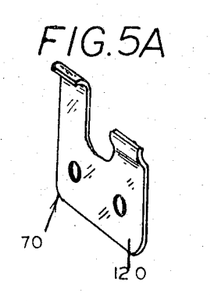
FIGURE 5A is a perspective view of a slide lock hinge bracket 70.
Figure 5B:
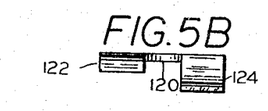
FIGURE 5B is a top view of the bracket 70.
Figure 5C:
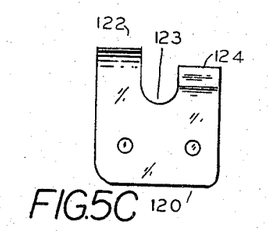
FIGURE 5C is a front view of the bracket 70.
Figure 5D:
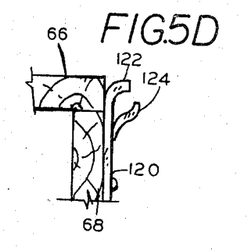
FIGURE 5D is a left hand view of the bracket 70.
Figure 5E:
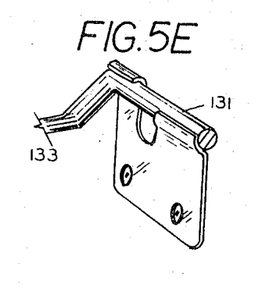
FIGURE 5E is a perspective view of the bracket 70 and a portion of the slide lock hinge 175 in their engaged position.

The hinge brackets 70 and 72 are identical to each other and the hinge brackets 74 and 76 are identical to each other. The hinge brackets 72 and 76 are mirror images of each other and the hinges 70 and 74 are mirror images of each other. The hinge bracket 72 is described in some detail and the description thereof applies to the other brackets 70, 74, and 76. The hinge bracket 70 comprises a base plate 120 and two arms which combination form a general U-shaped bracket as seen from its front and shown in FIGURE 5C.

Figure 5F:
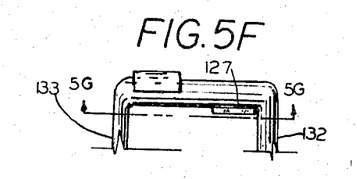
FIGURE 5F is a top front view, partly in section, of the combination of apparatus shown in FIGURE 5E.
Figure 5G:
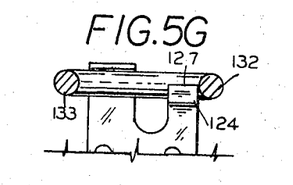
FIGURE 5G is a front view, partly in section, of the apparatus shown in FIGURES 5E and 5F.
Figure 5H:
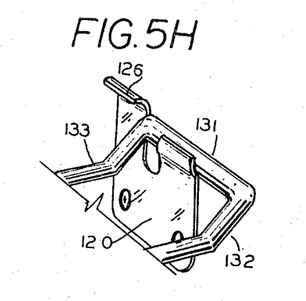
FIGURE 5H is a perspective view of the bracket 70 and the pivot hinge 157 in the initial stage of release of those elements.
Figure 5I:
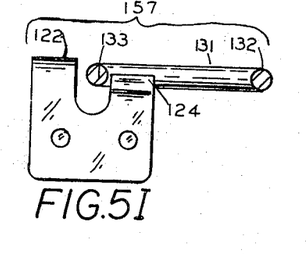
FIGURE 5I is a front view, partly in section, of the elements shown in FIGURE 5H.

The bracket 70 comprises the base plate 120 which is firmly affixed to the vertical flat plate 68, and, a central high arm 122 and a lateral low arm 124. A U-shaped space 123 is located between the arms 122 and 124. The arm 122 is J-shaped and serves to encompass the upper half of and hold down a cylindrical bar forming a portion of a U-shaped hinge 157. The arm 124 is genereally S-shaped with one lower end of the S attached to plate 120, the other upper end serves to hold to the rear and upwardly the right cylindrical bar portion 131 of hinge 157. Accordingly, the arms 122 and 124 serve to encompass the same right cylindrical bar 131. Nevertheless, they do permit, in cooperation with the space 123, that, when such straight bar portion 131 of hinge 157 is moved laterally as shown in FIGURES 5H and 5I that the arm 122 does not constrain the U-shaped member 157 from moving upwardly inasmuch as the topmost portion 126 of the arm 122 does not then extend over the top part of the cylindrical bar 131. However the arm 124 does in the locked position shown in FIGURES 1, 5E, 5F, 5G and 6, pass upwardly and to the front of the bar 131 and does prevent the U-shaped arm 157 of which bar 131 forms a part from moving centrally, i.e. to the left as shown in FIGURE 5G. However, the arm 124 does not prevent movement of the bar 121 from movement to the right as shown in FIGURES 5H and 5I for subsequent release thereof when desired. The uppermost portion 126 of the arm 124 extends forward half way of the total thickness of the cylindrical bar 131 (FIGURE 5F). Thereby the hinge bracket 70 does permit hinge 157, once having moved laterally away from the upper portion 126 of the arm 122, to be moved upward freely. This arrangement also provides that a bar 131 of hinge 157 may be moved downward freely into the position shown in FIGURES 5H and 5I to initiate engagement with bracket 70. In the engaged position, the topmost portion of the arm 124 of bracket 70 and corresponding arm on bracket 72 and the rigid attachment of hinge 157 and 159 to panel 154 maintains those hinges in contact with arm 124 of bracket 70 and corresponding arm on bracket 72 and prevents forward as well as an upward motion of panel 154 relative to panel 66 in the position of parts shown in FIGURES 1, 6, 8 and 10.

The left panel subassembly 53 and the right panel subassembly 54 are mirror images of each other. The reference numerals applied to components of the right subassembly will be one unit higher than the reference numerals applied to the corresponding component of the left panel subassembly, generally.

The left panel subassembly 53 comprises a lower locking panel subassembly 141, an intermediate panel subassembly 143, and an upper locking panel subassembly 145. Subassemblies 141, 143 and 145 are hingedly and permanently connected together with the lower locking panel subassembly 141 joined by the hinge subassembly 147 to the intermediate panel subassembly 143, and the intermediate panel subassembly 143 is joined to the upper locking panel subassembly 145 by the piano hinge assembly 149. The corresponding right lower locking panel subassembly 142 is joined to the left intermediate panel subassembly (a mirror image of subassembly 143) by the left hinge subassembly 148 and the right intermediate panel subassembly is joined to the right locking subassembly 146 by the right piano hinge subassembly 150. Elements 141, 143, 145, 147 and 149 are, respectively, mirror images of the subassemblies 142, 144, 146, 148, and 150, respectively.

The left lower locking panel subassembly 141 comprises a left lower locking panel 154, pivot hinges 157 and 159, locator blocks 171, 173, 175, and 177, locking lug 179, and desk arm holding recess 287.

The panel 154 is generally rectangular (except for one lateral rear cut out corner) rigid panel of adequate thickness (about ½" in the preferred embodiment) to provide rigidity therefor with its front and rear edges parallel and straight and its side and central edges parallel and straight. Its top surface and bottom surface (top surface 162 and bottom surface 164) are parallel and flat.

The panel 154 has flat upper surface 162 and a flat lower surface 164 parallel to each other. Panel 154 rear edge 160 and front edge 165 are parallel to each other. The central edge 161 and the outer edge 163 of panel 154 are parallel to each other. Edges 161 and 160 are right angles to each other.

Surface 162 has firmly attached thereto adjacent to and extending slightly past edge 160 and spaced away from each other by the major portion of the width of panel 154, a lateral right slide lock hinge pivot 157 and a central left slide lock hinge pivot 159. A corresponding left lateral slide lock hinge pivot 156 and, corresponding right central slide lock hinge pivot 158 are provided for subassembly 142 and similarly widely spaced apart. The central hinges are spaced slightly away from the central edges as 161 and the lateral hinges are spaced away from the corresponding lateral panel edge as 163.

Figure 6:
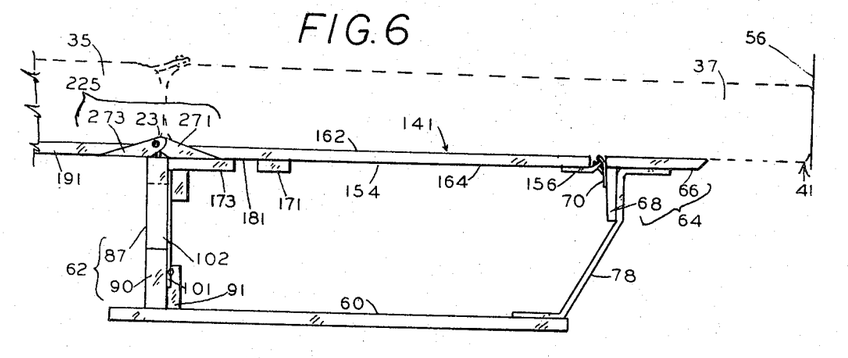
FIGURE 6 is a side view of the combination of base subassembly 51 and left panel subassembly 141 in the position of the subassembly 53 wherein it is used as a bed.
Figure 10:
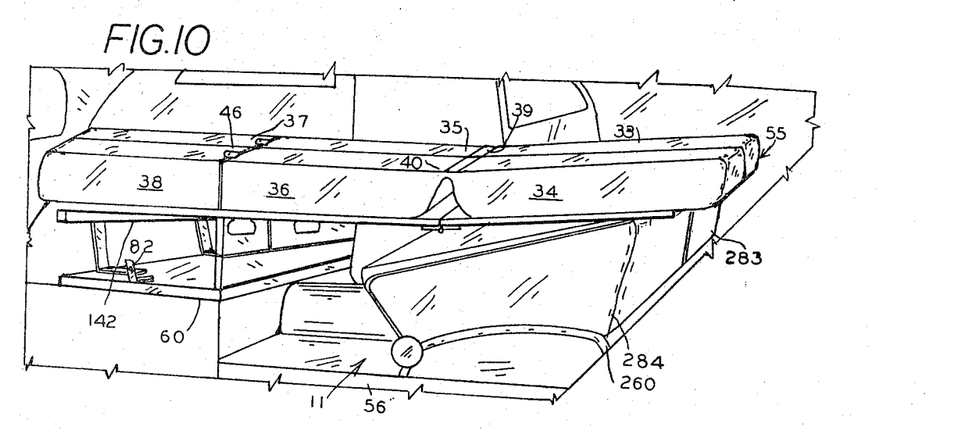
FIGURE 10 is a side perspective view of assemblies 52 and 55 in the use thereof as a bed.
Figures 11, 12:
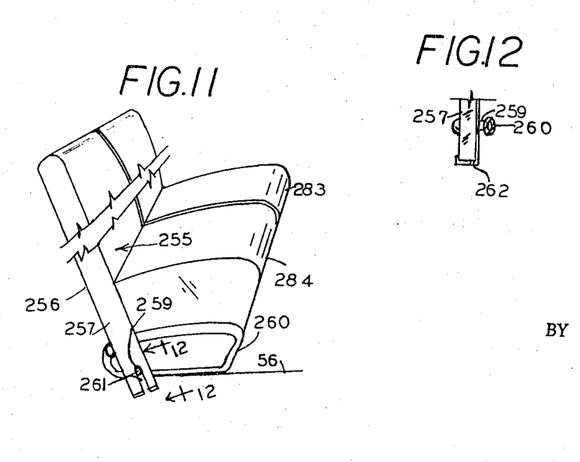
FIGURE 11 is an overall view of the front seat and detachable support for the front seat backrest portion with attention to details of area shown as zone 11 of FIGURE 10.
FIGURE 12 is a sectional front view of the apparatus of FIGURE 11 along plane 12—12 of FIGURE 11.
Figure 13:
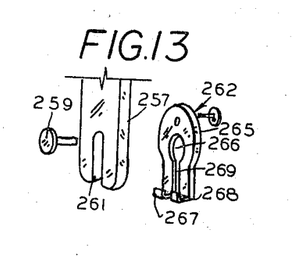
FIGURE 13 is an expanded or exploded perspective view of the component shown in FIGURE 12.

The panel 154 is provided with a lower surface 164 and an upper surface 162. It is to this lower surface 164 that the hinge pivots 157 and 159 are attached. The hinge pivots 157, 159, 156 and 158, respectively engage the slide lock hinge pivot brackets 70, 72, 76, and 74. All of the slide lock hinge pivots 156, 157, 158, and 159 are identical. The description of slide lock pivot 157 is accordingly applicable to the others. The pivot 157 comprises a straight rod cylindrical in transverse cross section bent in the form of a squared U which has a straight cylindrical central portion 131, an L-shaped left arm 132 and an L-shaped right arm 133. The arm 132 is provided with a looped terminal 134 which is attached by a bolt to the panel 154; similarly the terminal end of the arm 133 is formed into a loop 135 which is likewise firmly attached to the panel 154, as by a bolt. The center line or the axis of the cylindrical rod 131 within the bracket 70 is located at the middle of the thickness of the panel 66 and the bars held in brackets 72, 74 and 76 are similarly located. The arms 132 and 133 are L-shaped, whereby the loops 134 and 135 are attached to the bottom of panel 154 but the axis of the straight cylindrical portion 131 of hinges as 157 coincides with the middle of the thickness of panel 154. The thickness of the panel 154 and of the panel 66 are the same whereby, with the cylindrical bar portion 131 lying in the orifice therefor provided by the bracket 70 and corresponding relationships for the pivots 159, 158 and 156 relative to the brackets 72, 76 and 74 in which they lie, when the panel subassembly 52 is in the position in which it serves as a bed as shown in FIGURES 6 and 10, the top of panel 66 and panels 154 of subassembly 141 and corresponding panel 155 of subassembly 142 are co-planar.

A set of locator blocks 171, 173, 175, and 177, are located on and firmly attached to the bottom surface 164 of the panel 154. These blocks are located generally close to yet definitely spaced away from the front edge 165 of the panel 154. These locator blocks are located and arranged in cooperatively aligned central and lateral pairs; the neighboring faces of the members of each pair cooperate with each other and with the base subassembly 52 and with the other pair of locator blocks to provide orientation of the panel 154 in the position shown in FIGURE 7; the front faces of the pairs cooperate in the bed position as shown in FIGURES 6 and 10. The left lateral rear locator block 171 is located generally close to the lateral edge 163 of the panel 154 and is rectangular in all sections parallel to edges 165 and 163. The left lateral front locator block 173 is located close to but spaced away from the block 171. The block 173 is also rectangular in sections parallel to the edge 165 and to the edge 163. A left lateral locator space 181 rectangular in shape and the outline thereof parallel to edges 163 and 165 is provided between the blocks 171 and 173. The left central rear locator block 175 is of the same size and shape as block 171 and the left central front locator block is of the same size and shape as the block 173. A left central locator space 183 is rectangular in section and its edges parallel to the edges 163 and 161 of the panel 154. The spaces 181 and 183 are also rectangular when viewed parallel to the lower surface 164 of the panel 154. The spaces 181 and 183 are of the same thickness and size as each other and are located at the identical distance from the edge 165. The spaces 184 and 182 are also located at the same distance from the front of the panel of subassembly 142 on which they are located. Thereby, the panel subassemblies 53 and 54 are held in their position in which they serve as a seat as shown in FIGURE 7 wherein the subassembly 53 serves in its seating arrangement. It will be noted that the locator blocks 171 and 173 are sufficiently spaced apart so that in an initial stage of placing the panel 154 in position, block 171 is located to the lateral side of the block 91 sufficiently that the left locking lug 179 is located slightly lateral of the lug 93 attached to the block 91 and in such initial location the block 175 just contacts the central side of the block 91 and, in such initial position the pivots of hinges 100 and 104 are located below the bottom surface of the blocks 171 and 154. In the seating orientation of the panels of right panel subassembly 54, the lug 180 is located to the right of the block 92 attached to the piece 90 when the locator block 176 is adjacent to the central edge of the block 92 and the then lower surfaces of the blocks 172 and 176 do not extend as low as the pivots for the hinges 105 and 106 whereby the front edges of the locator block 172 engages the rear of the right of piece 90 to the right of block 92 and the front of block 176 engages the rear of base piece 90 immediately to the left of block 92 while the front of block 175 engages the base piece 90 immediately to the right of block 91 and the block 171 engages piece 90 immediately to the left of the block 91 in the position of parts shown in FIGURE 7. A slight movement to the right for panel 154 then brings the lower end of the tongue of the left locking lug 179 below and into engagement with the top of the lug 93 attached to the block 91 and serves to hold the lug 179 below the lug 93 and holds the panel 154 firmly to the panel 90. Similarly, a central movement of the subassembly 142 in the above described position serves to move the lower edge of lug 180 below the top of the lug 94 and serves to securely hold the subassembly 142 on top of the right portion of the base piece 90 in a position of parts such as shown in FIGURE 7.

The pieces 179 and 93 in this position thus serves to prevent central motion of the subassembly 141 toward the center of the car and the engagement of lug 180 with lug 94 serves to prevent movement toward the center of the car by the subassembly 142.

The engagement of the brackets 72 and 70 and recesses 243 and 245 of panel 241 of subassembly 145 serve to prevent lateral motion of the subassembly 53. The recesses 243 and 245 of panel 241 are firmly yet releasably held into engagement with brackets 72 and 70. Brackets 76 and 74 similarly engage recesses 244 and 246 of panel 242 of subassembly 146 and similarly prevent lateral motion of the subassembly 54. Thereby, in the position of parts as in FIGURE 7, the subassemblies 53 and 54 are reliably and firmly yet releasably held in their position to provide support to the cushions thereabove and provide a cushioned seat.

In the position of the parts of a panel subassembly as 154 in the position of parts shown in FIGURE 6 the front edges of the blocks 173, 177 and 178 and 174 are parallel to each other and all extend in the same vertical plane. The front edges of those blocks serve to engage the rear edge of the panels 87 and 88. The bottom surface 164 of the panel 154 engages the top of panel 87; however, the front edge 165 only passes as far as ½ of the thickness of the panel 87 and there the line of the hinge subassemblies 147 passes parallel to the edge and in line with and directly over the center of the top of panels 87 and 88. Thereby the front edge of the panel 154 is supported on top of the panel 87 and the corresponding panel 155 of the subassembly 142 is supported and located on top of panel 88. In the position thus shown in FIGURE 6 the hinge pivots 157, 156, 159 and 158 snugly and firmly engage with their respective brackets, 70, 74, 72, and 76, and prevent lateral movement of the rear edges of those subassemblies, and for instance, prevents the lateral movement of the rear edge 160 of the panel 154. In this position of parts shown in FIGURE 6, the block 115 located on the rear surface of panel 87 engages the central surface of the block 177 and prevents the movement of the block 177 laterally.

A similar relationship provides, in the position of parts as shown in FIGURE 6, for the subassembly 142 that the block 178 on the bottom surface of the panel 155 engages the block 116 and the lateral motion of the subassembly 142 is then prevented. Accordingly, this relative position of the blocks 115 and 116 and of the pivot hinges and their brackets on each panel subassembly secures the panel subassemblies as 141 and 142 from lateral as well as central motion until released by lifting the edge 165 and 166 (via hand holes 113 and 114).

The engagement between the hinges 157 and 159 with the portions of the brackets 70 and 72 (such as portion 124 of bracket 120) prevents forward motion of the panel 154 and the attachment of the hinge 157 to the vertical plate 68 and the attachment thereof to the brackets as 78 to the base panel 60 prevents rearward motion of the rigid panel 154 in the position of parts shown in FIGURE 6. Corresponding relationships hold for the corresponding panel of subassembly 142.

The relationships of parts which hold the subassembly 141 in place during the position of parts of the subassembly 53 shown in FIGURE 7 wherein subassembly 53 serves as a seat is obtained by the rigid attachment of the subassemblies 141, 143, and 145 through the hinges 147 and 149 and that recesses 243 and 245 in the rigid panel 145 engage the brackets 72 and 70 and elastic strap 273 is provided to firmly hold the subassembly 145 into engagements with the brackets 70 and 72 and prevent relative movement therebetween and thereby prevent side to side movement of the subassembly 145 until the means 137 are positively released. In the preferred embodiment, the panel 241 is provided with a clamp 271 which holds an elastic strap 273 which strap is provided with a hole 275. The hole 275 engages a hook 277 firmly attached to the frame of the car. Corresponding elements are provided on panel 242 to hold the recesses (246 and 244) thereof in similar firm engagement with brackets 74 and 76. The rigid form of those panels forming subassemblies 145, 143, and 141 and their intermediate hinge connections prevent rotation of the panel 145 with respect to 143, and 143 with respect to subassembly 141, and as the subassembly 141 is firmly held to the base piece 90 by the locator blocks 171, 173, 175 and 177 by the location of the piece 90 in the spaces 181 and 183 (between the pairs of blocks 171 and 173 and 175 and 177, respectively) the subassembly 53 is firmly and reliably held in place during the position of parts of subassembly 53 wherein such parts serve as a seat as shown generally in FIGURE 7. Similar relationships also hold for the right panel subassembly 54.

The left intermediate panel subassembly 143 is attached to the left panel subassembly 141 by a left hinge subassembly 147. The subassembly 143 comprises a left intermediate panel 191, a left table or desk support arm 193, and a left desk support arm pivot pin 195. The subassembly 144 is comprised of elements 192, 194, and 196 respectively corresponding to and mirror images of elements 191, 193, and 195.

The arm 193 has a downwardly moving end 197 and an upwardly moving end 199. The arm 194 has corresponding ends 198 and 200.

Figure 8:
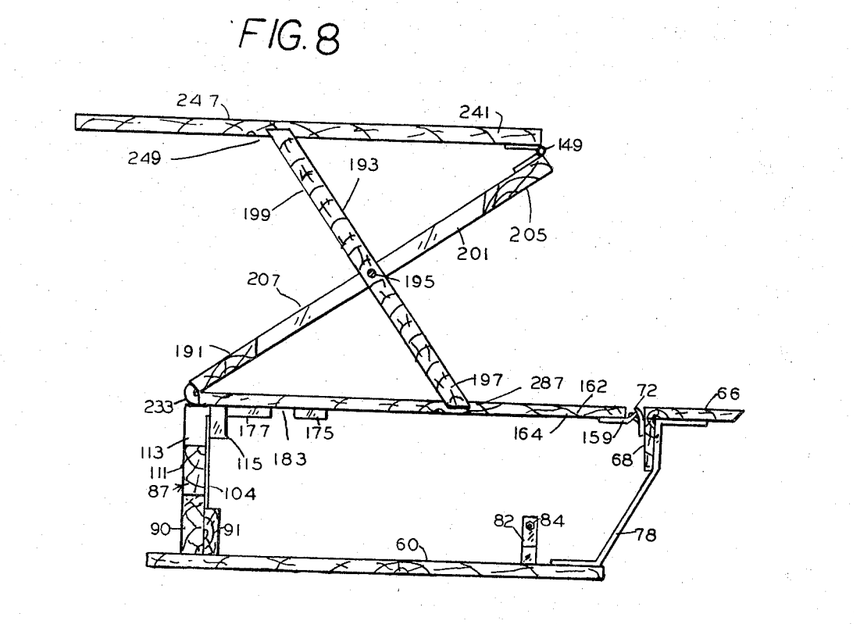
FIGURE 8 is a sectional view in section along plane 8—8 of FIGURE 2, of subassembly 53, in use as a table or desk.

In the FIGURE 8, the arm 193 is shown in its desk or table supporting position with its ends located in the recesses 249 and 287 provided therefor in the subassemblies 145 and 141 respectively.

The arm 193 is located in a slot 201 therefor in panel 191 and the arm 194 is located in a corresponding slot 202 therefor in the panel 192.

The left intermediate panel 191 has an upper bed surface 205, a lower bed surface 207, a rear edge 209, a front edge 211, a center edge 213, and a side edge 215. The right intermediate panel has corresponding elements 206 through 216 for each of the elements 205 through 215 of panel 191.

The hinge subassembly 147 comprises a left lateral hinge 225, a left central hinge 227. Corresponding hinges 226 and 228 are located between the subassemblies 142 and 144. Hinge 225 comprises a rear plate 271 firmly attached to the left or lateral edge of panel 154 and a front plate 273 firmly attached to the lateral or left edge of panel 191. Hinge 227 is a mirror image of hinge 225 and its components are attached to the central edges of panels 154 and 191.

The hinge 225 has a pin 231 that pivotally joins plates 271 and 273 and is a right circular cylinder in shape. Corresponding pins 233, 232 and 234 are in hinges 227, 226 and 228. Pins 231 and 233 are coaxial and, in the orientation of the panel subassemblies 53 and 54 for their use as double bed or as double seat, the pins 231, 233, 232, and 234 are all coaxial and such pins when in the bed position of its subassembly 53 or 54 are located vertically above the center of panels 87 and 88, generally as shown in FIGURES 6 and 2.

The pins 231 and 233 lie in the plane of the upper surface 162 of the panel 154 and also the upper surface 205 of panel 191, the pins 232 and 234 lie in the plane of the upper surface of the panel 155 for the subassembly 142. Surface 205 of panel 191 lies flat against surface 162 of panel 154 when those panels are in their position of forming a seat as shown in FIGURE 7. This flat surface to surface contact provides functional cooperation that aids in the orientation of the such panel 154 due to the locking engagement of the panel 241 of subassembly 145 with the brackets 70 and 72 on subassembly 46. Corresponding relations are provided in subassembly 54 for panel 155, panel 242, subassembly 146 and latches 74 and 76.

Figure 1:
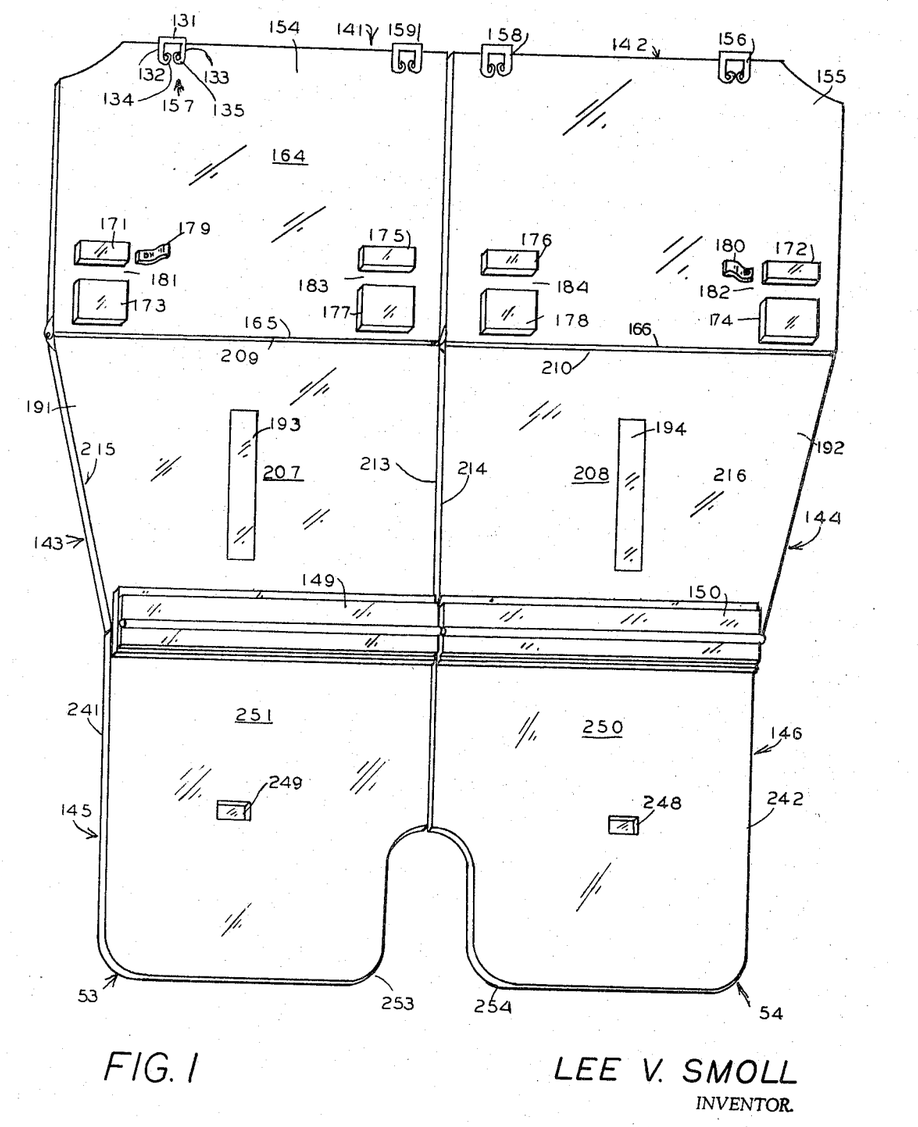
FIGURE 1 is a diagrammatic plan view of the bottom of the panel subassemblies 53 and 54 in their form for use as a bed support.
Figure 2:
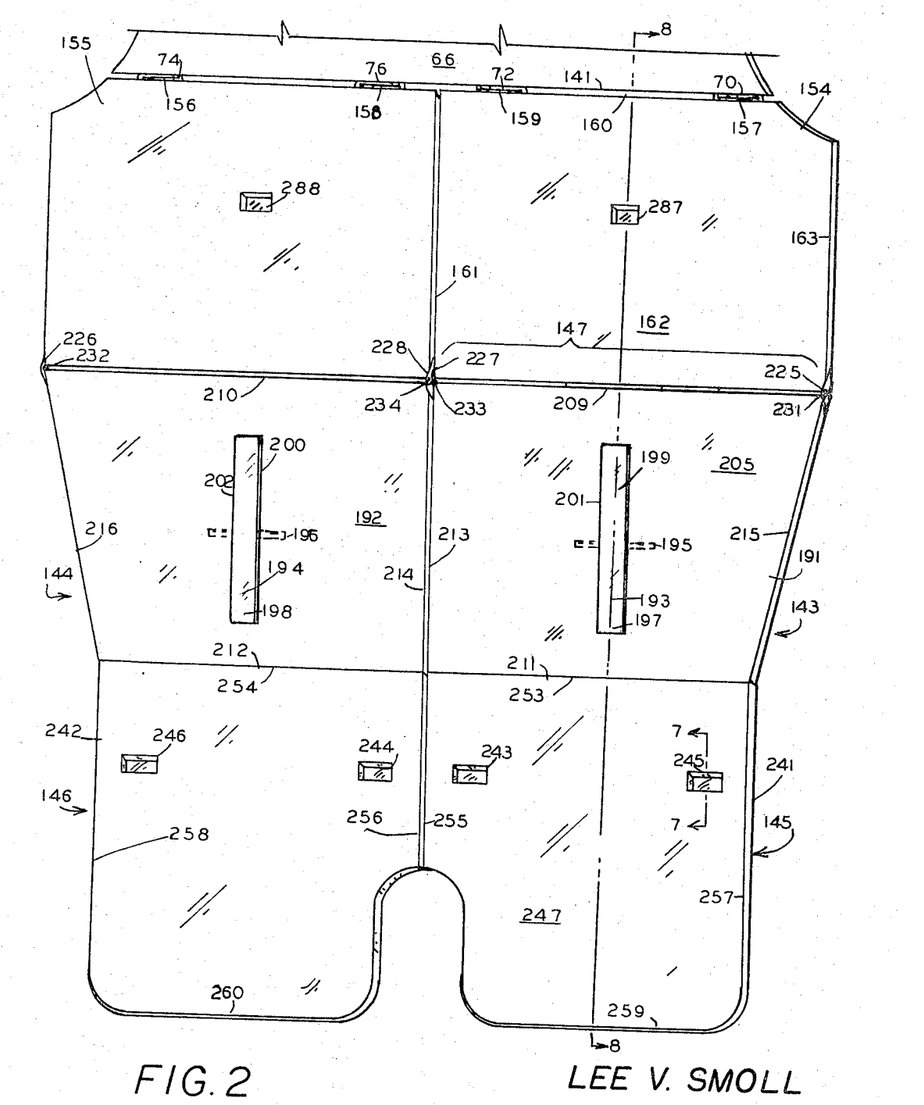
FIGURE 2 is a top view of the panel subassemblies 53 and 54 as seen from the top thereof when those panel subassemblies are in their form for use as a bed support.
Figure 3:
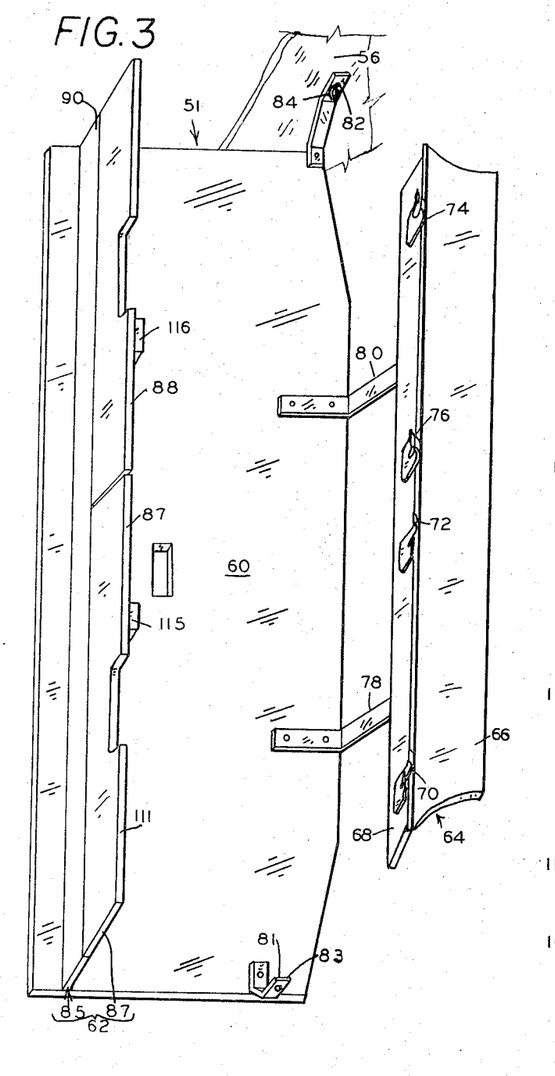
FIGURE 3 is a top and side oblique view of the base subassembly 51 firmly affixed to the car.
Figure 4:
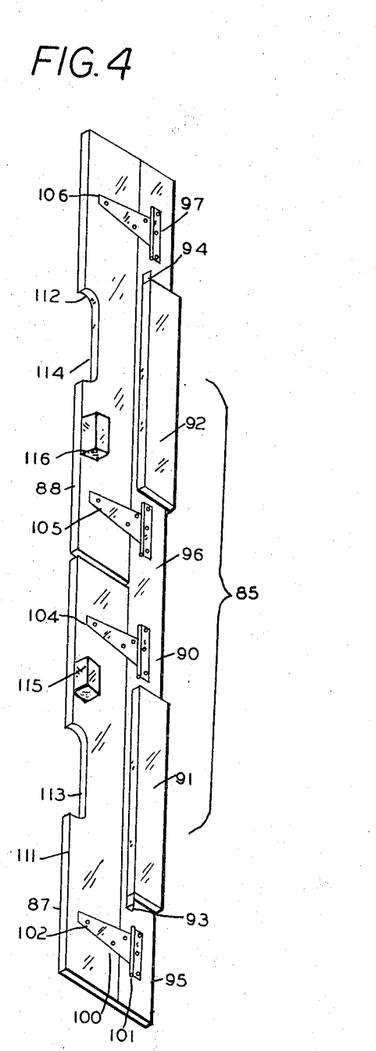
FIGURE 4 is a rear and oblique view of the front panel subassembly 62 of the base assembly 51 showing in particular the location of the locking hinges and lugs and locator blocks.

The left upper locking panel subassembly 145 comprises a left upper locking panel 241 which is provided on its upper (as shown in FIGURES 2 and 10) surface 247 with rear central locking recesses 243 and rear lateral locking recess 245. Recess 245 firmly fits the upper portions as 122 and 124 of bracket 70 and recess 243 similarly snugly fits the top of bracket 72.

The lower surface 251 of the panel 241 is provided with a recess 249 for reception of the arm 193 that supports the panel 241 in its desk or table supporting position. The right panel 242 of subassembly 146 is provided with elements 244, 246, 248 and 250 that correspond respectively to the elements 243, 245, 249 and 251 respectively of the subassembly 145.

There is a cutout portion 253 on the inner forward portion of panel 241 and a matching portion 254 on the right panel 242. These serve, in a small car, to surround the gear shift lever section of the car.

The panel 241 has a straight rear edge 253, a straight central edge 255, a lateral edge 257 and a straight front edge 259. The edge is parallel to edge 253; the edge 259 is perpendicular to edge 255. Corresponding elements 254, 256, 258 and 260 on panel 242 correspond, respectively, to items 253, 255, 257, and 259 on panel 241. The edges 255 and 256 are adjacent and parallel to each other in the position of parts shown in FIGURES 2 and 10. The edges 211 and 253 are, in the relationship shown in the bed position of the subassembly 53 adjacent and parallel to each other and joined by the hinge subassemblies 149. The hinge subassembly 149 is a piano hinge which extends the full width of panel 241 and one hinge plate of which hinge is joined firmly to the surface 207 of panel 191 at one side thereof and the other hinge plate of which is joined to surface 251 of panel 241. The hinge 150 is similarly joined firmly to the panel 192 by one hinge plate of that piano hinge and to panel 242 by its other hinge plate and extends the full width of panel 242. The axis of the pivot pin of the piano hinge 150 is coaxial with that of hinge 149 in the position of parts shown in FIGURES 1, 2, and 10. The hinges 149 and 150 are very sturdy and firmly yet pivotally joined to their hinge pins.

Figure 9:
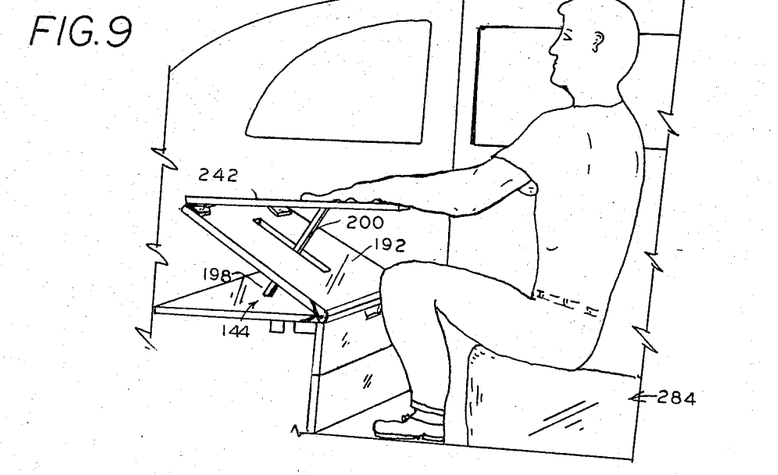
FIGURE 9 is a perspective view of the subassembly 54 and subassembly 51 in their use as a desk or table.
Figure 14:
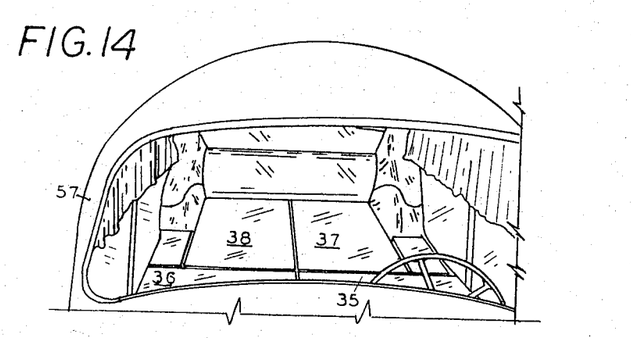
FIGURE 14 is a front oblique and perspective view of the rear portion of apparatus 55 in bed position of that subassembly and subassembly 52 as seen through front window of the car 57.
Figure 15:
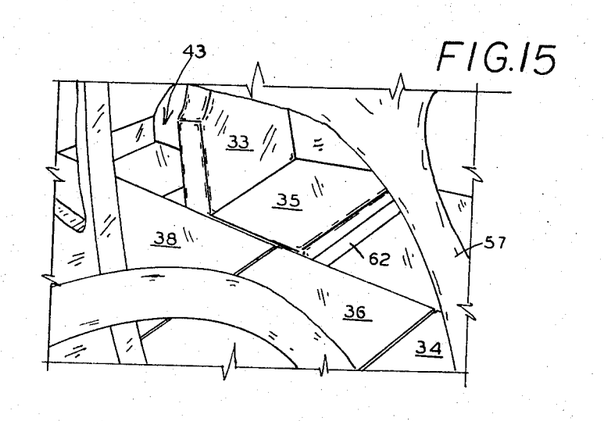
FIGURE 15 is a side oblique and perspective view of apparatus 50 as seen through the right door of the car 57 with subassemblies 51 and 53 in the seat position and subassemblies 51 and 54 in the bed position and the cushions over such subassemblies.

In operation either or both of the panel subassemblies 52 and 53 may be located with their components in the positions shown in either FIGURES 6, 7, or 8. FIGURE 6 shows those elements formed into use as a support for a bed and which orientation is further shown in FIGURES 10 and 14 or, the subassemblies 52 and/or 53 may be arranged as a chair as shown in FIGURES 7 and 15. The orientation of parts for the desk subassembly is shown in FIGURES 8 and 9. As shown in FIGURES 9 and 15, subassemblies 53 and 54 may be concurrently used in different positions.

According to this invention, the rear seat portions as 255 of the front seats 283 and 284 of the car 57 are removed prior to locating the panel subassemblies 145 and 146 thereon. For this purpose a modification is made in the structure of the seat support and a clip provided therefor. In detail, the backrest portion of seat 284 is supported on vertical arms, one on the left and one, 256, on the right side thereof. The lower portion 257 of the arm 256 is attached by a bolt 259 to the frame 260 of the seat 58. Frame 260 is attached to the frame 56 of the car 57. A downwardly extending slot 261, having the same width as the shaft of bolt 259 in order to encompass it, extends downwardly within the portion 257. The inner portion of the arm portion 257 is provided with a J-shaped retaining clip 262. This clip 262 has a spring action. The clip 262 has an upper portion 265 with an orifice 266 therein which orifice engages and encompasses, and firmly yet resiliently grips the shaft of bolt 259. The lower legs of the clips (267 and 268) are spaced apart by a space 269 slightly smaller than the diameter of the bolt 259. Thereby the supports as 256 and 257 for the rear portion 255 of the seat 284 are readily removed when desired and yet firmly held in place in the position thereof required for its use as a chair as when the subassemblies 53 and 54 are both in the seat position such as shown in FIGURE 7. Both front seats 283 and 284 of the conventional sedan type automobile 57 may be removed so that full sized beds using the apparatus 50 may be used to form a double bed in the sedan, or only one chair as 284 in one side may be changed to have its back 255 removed and thereby to allow a bed to be on the right side of the car while the driver continues his driving using the seat in its seat position while the left hand subassembly 53 and the cushions thereof are maintained in their seat position as shown in FIGURE 15.

Panels 242 and 241 rest on the bottom portions of front seats as 284 and 283, respectively and make use of the springs in such seats. This use of those seats provides resilient support to panels 241 and 242 and makes comfortable the use of the bed arrangement of subassemblies 53 and 54 and cushion assembly 55 resting thereon.

In the bed position of subassembly 53 the hinges 157 and 159 are firmly joined in and supported by the brackets 70 and 72 respectively. In the bed position of the subassembly 141, the hinges such as 70 and 72 permit no forward or rearward motion of the panel 154. Motion of panel 154 to the right is permitted by the arm 124 but not to the left. However, the block 115 on panel 87 engages block 177 and prevents the panel subassembly 141 from moving to the right. The rigidity of the panel subassembly 142 forestalls any twisting relationship that might release the hinges 157 or 159 from their brackets.

Accordingly, it is only by lifting up the panel 154 and removing the engagement of the block 177 with block 115 that the subassembly 141 can be moved from engagement with panel 87. Accordingly, access is provided to 154 through the hand hole 113 whereby panel 154 may be conveniently lifted in view of the flexibility about hinges 159 and 157. Then the subassembly 141 may have its edge 165 rotated upwards and about hinges 157 and 159. Thereafter the panel 141 may be readily moved laterally and taken out of engagement with the hinge brackets 70 and 72. Thereafter the subassembly 53 may be rearranged and brought to the seating position.

The subassembly 55 comprises a left cushion subassembly 31 and a right cushion subassembly 32, subassembly 32 being a mirror image of 31. The subassembly 31 comprises a backrest cushion 33 flexibly joined to a back seat cushion 35 and a rear mattress cushion 37. The cushions 33 and 35 have the same size as panels 241 and 191. Cushions 37 and 38 are longer than panels 154 and 155. Cushion 35 is detachably connected to cushion 37 by snaps 45 (and cushion 36 to 38 by snaps 46). Each cushion is formed of 3 inch thick foam rubber with a $\frac{1}{32}$ inch thick vinyl cover. Adjacent edges of cushions 33 and 35 are joined by a flexible strip 39. Cushion 33 is provided with a cap 41 that firmly holds cushion 33 to the top of panel 241 in the seat position of that panel. Subassembly 32 is formed of elements 32, 34, 36, 38 and 40 and 42 each a mirror image of elements 31, 33, 35, 37, 39 and 41, respectively. Cushions 37 and 38 are readily stored in the space 43 to the rear of panel 241 in the seat support position thereof. The cushions for the subassembly 55 are used not only for the chair position of subassemblies 53 and 54 but also for the bed, the same cushions having the two uses.

Hinge 147 permits surface 205 of panel 191 to extend downwards at a 10° angle to the plane of surface 162 as well as to the relationship shown in FIGURE 7. Hinge 149 however permits no less than a 175° angle between surface 205 and 247. In the orientation of parts for use as a bed, panel 141 is firmly located in assembly 51, yet hinge 147 and the piano hinge 149 and seat 283 provide a comfortable vertically resilient support for the panel subassemblies 145 and 146 and the cushions thereabove, while the firm location of panel 154 to base subassembly 51 and the rigid panels 191 and 241 and firm hinges 147 and 149 prevents sideway motion of those panels.

The wood of the panels of apparatus 50 is, preferably, ½" plywood. Either recess 249 or 287 may be deleted and still provide a satisfactory desk or table surface on top of panel 241 in position of FIGURE 8. The hinges 147, 148, 149 and 150 permit pivotal motion about the hinge pins thereof but the hinge plates as 271 and 273 of hinges 225, 226, 227, and 228 are rigid and sturdy and firmly fixed to the bottom (as in FIGURE 6) surfaces of the adjacent panels and permit no substantial sideways motion of the panels joined thereby. The hinge plates of piano hinge 149 smoothly interdigitate and prevent relative sideways or lateral motion of those hinge plates and the panels to which they are attached. The same relations occur for hinge 150. The snaps as 45 serve to hold cushion as 35 to panel end adjacent thereto as 191 in the position thereof shown in FIGURE 7.

Although in accordance with the provision of the patent statutes, particular preferred embodiments of this invention have been described and the principles of the invention have been described in the best mode in which it is now contemplated applying such principles, it will be understood that the operations, constructions and use shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A combination structure for use in automobiles, said automobiles comprising a frame and a front seat, a base subassembly attached to the frame of said automobile, a foldable panel subassembly cooperatively attached to said base subassembly, said base subassembly comprising a plurality of like spaced-apart hinge brackets, each of said hinge brackets having one arm member closed at the top and open at the front on one side and another arm member laterally spaced therefrom closed on its bottom and front and open at its top at its other side, a straight elongated cylindrical channel defined by the space between said arm members on said one hinge bracket, the channel between the arms of one said like member and the other being coaxial with each other, said hinge brackets attached to said base subassembly, an upwardly projecting vertical support means spaced forwardly of said hinge means and extending transversely to the frame of said automobile, the pivotal panel subassembly comprises a first locator panel which is rigid and a second rigid and flat panel permanently attached thereto by pivotal hinge elements, one end of one of said hinge elements being laterally spaced apart from the other end of said one of said hinge elements, and a third rigid panel, and said second and said third panels being joined to each other by hinge means, and said first panel being provided with hinge elements which engage with hinge brackets on said base subassembly and permit lateral motion therein in only one direction when said hinge element and bracket element are fully engaged, said base subassembly support means also comprising lug means projecting transversely of said vertical support means, said first panel comprising a pair of downwardly projecting lugs each member of said pair being transversely spaced away from the other along the width of said panel and the front edge of said lugs being spaced away from the front edge of said first panel, and said lugs on said first panel engage said lug means on said vertical support means when said panel subassembly and said base subassembly are positioned for use and said panel subassembly is engaged with said hinge bracket.

2. Apparatus as in claim 1 wherein said car comprises a frame and a front seat supported in said frame, said front seat having a backrest said backrest supported on a frame and said frame being attachable and detachable from the support therefor, and said third panel is supported on said front seat of said car for resilient vertical motion thereof.

3. Apparatus as in claim 1 also including a plurality of cushions, each cushion supported on one of said panels.

4. Apparatus as in claim 1 wherein said second panel is provided with a slot and a rigid arm pivotally mounted in said slot and extends longitudinally of said second panel, one end of the arm toward the first panel and at the other end extending towards the second panel.

5. Apparatus as in claim 1 wherein a downwardly projecting lug on said first panel engages a rearwardly projecting lug on said support member of said base subassembly whereby the engagement of said lugs prevents lateral motion of said first panel subassembly.

6. Apparatus as in claim 5 wherein each of said pairs of lugs comprises a pair of longitudinally spaced first and second lugs with a space between the first and second lugs of each of said pair, and said vertical support means is engaged in said longitudinal space between said downwardly projecting lugs on said first panel and another downwardly projecting lug on said first panel on the same side of said surface thereof as said downwardly projecting lugs, said other lug projects downward and in the same direction as that in which said hinge brackets permit movement of said panel relative to said hinge brackets.

7. Apparatus as in claim 1 wherein said foldable panel subassembly is one of a pair of foldable panel subassembly each a mirror image of the other and said front seat of said automobile is one of a pair of seats each a mirror image of the other.

8. Apparatus as in claim 1 wherein said panel subassembly is one of a pair of like foldable panel subassemblies.

9. Apparatus as in claim 8 wherein said front seat of said automobile is one of a pair of seats and the width of one of said panel subassemblies is substantially the same as the width of the front seat to its front.

References Cited by the Examiner

UNITED STATES PATENTS

| | | | |
|---|---|---|---|
| 2,502,061 | 3/1950 | Radford | 296—66 |
| 3,097,881 | 7/1963 | Aguilar | 296—66 |
| 3,165,350 | 1/1965 | Willson | 296—65 |

BENJAMIN HERSH, *Primary Examiner.*

J. H. BRANNEN, *Assistant Examiner.*